US010580001B2

(12) United States Patent
Betancourt et al.

(10) Patent No.: US 10,580,001 B2
(45) Date of Patent: Mar. 3, 2020

(54) VEHICLE TRANSACTION DATA COMMUNICATION USING COMMUNICATION DEVICE

(71) Applicant: Epona, LLC, Franklin, TN (US)

(72) Inventors: Ernest Betancourt, Lascassas, TN (US); Vince Peschio, Brentwood, TN (US)

(73) Assignee: Epona LLC, Franklin, TN (US)

( * ) Notice: Subject to any disclaimer, the term of this patent is extended or adjusted under 35 U.S.C. 154(b) by 608 days.

(21) Appl. No.: 14/153,843

(22) Filed: Jan. 13, 2014

(65) Prior Publication Data
US 2015/0199685 A1    Jul. 16, 2015

(51) Int. Cl.
*G06Q 20/40* (2012.01)
*G06Q 20/32* (2012.01)
*G06K 7/10* (2006.01)
*G06Q 20/20* (2012.01)

(52) U.S. Cl.
CPC ......... *G06Q 20/40* (2013.01); *G06K 7/10386* (2013.01); *G06Q 20/20* (2013.01); *G06Q 20/325* (2013.01); *G06Q 20/3224* (2013.01); *G06Q 20/3278* (2013.01)

(58) Field of Classification Search
CPC .. G06Q 20/40; G06Q 20/325; G06Q 20/3278; G06Q 20/3224; G06Q 20/20; G06Q 20/32; G06K 7/10386; G06K 7/10
See application file for complete search history.

(56) References Cited

U.S. PATENT DOCUMENTS

| | | | | |
|---|---|---|---|---|
| 5,890,520 A | * | 4/1999 | Johnson, Jr. | ........... B67D 7/067 141/231 |
| 5,956,259 A | * | 9/1999 | Hartsell, Jr. | ......... B67D 7/0401 700/282 |
| 6,026,868 A | * | 2/2000 | Johnson, Jr. | ........... B67D 7/067 141/94 |
| 6,073,840 A | * | 6/2000 | Marion | .................. B67D 7/067 235/381 |

(Continued)

OTHER PUBLICATIONS

Jan. 25, 2016 (CA) Office Action—App. 2,876,465.
Dec. 30, 2016 (CA) Office Action—App. 2,876,465.

*Primary Examiner* — Kenneth Bartley
(74) *Attorney, Agent, or Firm* — Banner & Witcoff, Ltd.

(57) ABSTRACT

A transaction request may be initiated and completed using a vehicle based communication system. A vehicle may include a wireless tag or transponder, and a wireless system at a service station or fuel station can detect the presence of the wireless tag in a predefined wireless service area. The wireless system can transmit location information based on the detected location of the wireless tag or vehicle to the wireless tag. A communication device may establish a communication connection with a wireless tag or transponder, and through the communication connection, the wireless tag can transmit the location information received from the wireless system to the communication device. The requester may use the communication device to provide or enter transaction information. The communication device can transmit the transaction information for transaction authorization, and in response to authorization of the transaction, a transaction authorization indication may be transmitted to a point of sale.

19 Claims, 6 Drawing Sheets

(56) References Cited

U.S. PATENT DOCUMENTS

| | | | | |
|---|---|---|---|---|
| 6,089,284 A * | 7/2000 | Kaehler | B67D 7/348 | |
| | | | 141/2 | |
| 6,313,737 B1 * | 11/2001 | Freeze | B67D 7/145 | |
| | | | 141/129 | |
| 6,343,241 B1 * | 1/2002 | Kohut | B60S 5/02 | |
| | | | 700/232 | |
| 6,574,603 B1 * | 6/2003 | Dickson et al. | 705/15 | |
| 6,882,900 B1 * | 4/2005 | Terranova | B67D 7/067 | |
| | | | 700/236 | |
| 7,640,185 B1 * | 12/2009 | Giordano et al. | 705/23 | |
| 8,429,095 B1 * | 4/2013 | Ryan | B67D 7/145 | |
| | | | 141/231 | |
| 8,433,441 B2 * | 4/2013 | Oldham | B67D 7/145 | |
| | | | 700/231 | |
| 8,577,734 B2 * | 11/2013 | Treyz et al. | 705/26.1 | |
| 8,718,797 B1 * | 5/2014 | Addepalli et al. | 700/17 | |
| 2001/0034565 A1 * | 10/2001 | Leatherman | B67D 7/348 | |
| | | | 700/232 | |
| 2002/0002534 A1 * | 1/2002 | Davis et al. | 705/39 | |
| 2002/0046117 A1 * | 4/2002 | Marion | B67D 7/067 | |
| | | | 705/14.38 | |
| 2002/0089434 A1 * | 7/2002 | Ghazarian | G06Q 10/08 | |
| | | | 340/988 | |
| 2002/0113082 A1 * | 8/2002 | Leatherman et al. | 222/52 | |
| 2003/0065805 A1 * | 4/2003 | Barnes, Jr. | 709/231 | |
| 2003/0191581 A1 * | 10/2003 | Ukai et al. | 701/207 | |
| 2005/0024189 A1 * | 2/2005 | Weber | 340/425.5 | |
| 2005/0174235 A1 * | 8/2005 | Davis | G06Q 10/08 | |
| | | | 340/539.13 | |
| 2005/0174236 A1 * | 8/2005 | Brookner | 340/539.26 | |
| 2006/0180371 A1 * | 8/2006 | Breed et al. | 180/197 | |
| 2007/0008152 A1 * | 1/2007 | Parias | F17C 13/003 | |
| | | | 340/573.1 | |
| 2007/0149184 A1 * | 6/2007 | Viegers | G06Q 10/06 | |
| | | | 455/422.1 | |
| 2007/0224938 A1 * | 9/2007 | Jung et al. | 455/41.2 | |
| 2008/0040023 A1 * | 2/2008 | Breed et al. | 701/117 | |
| 2008/0080682 A1 * | 4/2008 | Ogunwale | G06Q 30/02 | |
| | | | 379/93.17 | |
| 2008/0091544 A1 * | 4/2008 | Linlor | 705/17 | |
| 2008/0203146 A1 * | 8/2008 | Betancourt | G06Q 20/20 | |
| | | | 235/375 | |
| 2008/0208701 A1 * | 8/2008 | Betancourt | G06Q 10/02 | |
| | | | 705/5 | |
| 2009/0045978 A1 * | 2/2009 | Weitzhandler et al. | 340/933 | |
| 2009/0248538 A1 * | 10/2009 | Taylor | 705/26 | |
| 2009/0306834 A1 * | 12/2009 | Hjelm | H04L 12/2809 | |
| | | | 701/1 | |
| 2010/0088127 A1 * | 4/2010 | Betancourt et al. | 705/5 | |
| 2010/0273504 A1 * | 10/2010 | Bull | G01S 5/02 | |
| | | | 455/456.1 | |
| 2010/0273543 A1 * | 10/2010 | Weitzhandler et al. | 455/575.7 | |
| 2010/0280956 A1 * | 11/2010 | Chutorash et al. | 705/64 | |
| 2011/0213683 A1 * | 9/2011 | Betancourt | G06Q 30/06 | |
| | | | 705/30 | |
| 2011/0288721 A1 * | 11/2011 | Christensen | G06Q 20/40 | |
| | | | 701/29.5 | |
| 2012/0303531 A1 * | 11/2012 | Betancourt | G06Q 20/20 | |
| | | | 705/44 | |
| 2013/0091452 A1 * | 4/2013 | Sorden | E21B 41/0092 | |
| | | | 715/771 | |
| 2013/0185193 A1 * | 7/2013 | Boling | G06Q 20/3224 | |
| | | | 705/39 | |
| 2013/0214904 A1 * | 8/2013 | Ryan | B67D 7/145 | |
| | | | 340/5.61 | |
| 2014/0137953 A1 * | 5/2014 | Gibb et al. | 137/351 | |
| 2014/0303807 A1 * | 10/2014 | Addepalli et al. | 701/1 | |
| 2015/0199685 A1 * | 7/2015 | Betancourt | G06Q 20/40 | |
| | | | 705/44 | |

* cited by examiner

VEHICLE TRANSACTION DATA COMMUNICATION USING COMMUNICATION DEVICE

TECHNICAL FIELD

Aspects described herein generally relate to processing transactions from a vehicle. More specifically, aspects relate to processing vehicle transactions using a communication device.

BACKGROUND

In a society where the assertion "time is money" has become more fact than fiction, efficiency and punctuality have developed into highly valued assets in many industries. In the transportation and shipping industry, for example, efficiency and punctuality are defining qualities that often set successful companies apart from those that fail. Particularly, greater efficiency and punctuality may lower transportation and shipping costs, which may, in turn, reduce costs to potential clients and attract a larger customer base.

One aspect of transportation and shipping that may impact the cost and punctuality of deliveries is the amount of time spent on refueling transportation vehicles. For instance, many packages and goods are delivered using trucks that often travel long distances between pick-up and delivery. Since a truck or vehicle's fuel tank is of a limited size, drivers need to occasionally break from the transportation route to refuel. Refueling time may vary greatly depending on a variety of factors including required processing time for a fuel sale and/or transaction. Typically, a driver of a transportation vehicle must enter a refueling station, park the vehicle, exit the vehicle, enter authorization and/or payment information for the transaction at a point-of-sale system and wait for approval before starting to refuel. Time may be saved and delays reduced by, for example, simplifying the refueling process and increasing the flexibility and convenience of how transactions are processed and authorized.

SUMMARY

According to some aspects described herein, a vehicle may include a wireless tag or transponder, and a wireless system at a service station or fuel station can detect the presence of the wireless tag in a predefined wireless service area. The wireless system can transmit location information based on the detected location of the wireless tag or of the vehicle to the wireless tag. The communication device may establish a communication connection or link with a wireless tag or transponder, and through the communication connection, the wireless tag can transmit the location information received from the wireless system to the communication device. A transaction requestor may also use the communication device to provide or enter transaction information. The communication device can transmit the transaction information for transaction authorization, and in response to authorization of the transaction, transmit a transaction authorization indication to a point of sale. In some examples, the communication device may be located within the vehicle thereby providing the requester with the ability and convenience of providing transaction information from within the vehicle. In other examples, the communication device may be a portable device, carried by the requestor.

According to another aspect, the communication device may communicate directly with a transaction processing system to request authorization of a transaction. The communication may be accomplished through a wireless network such as a wireless wide area network (WAN), satellite communication network, cellular network and/or wireless Local Area Network (LAN) such as Wi-Fi.

In yet another aspect, the communication device may establish a wired or wireless communication connection with a wireless transponder such as a Bluetooth connection, near field communication (NFC) connection, infrared (IR), or Wi-Fi connection. The communication device may use this connection to transmit and receive data to and from the system. The communication device may transmit the transaction information provided by the requester to the wireless tag, and the wireless tag may transmit the received transaction information to a point of sale system through a wireless system of the service station. The point of sale system may cooperate with a transaction processing system in determining whether to authorize the transaction.

These as well as other advantages and aspects are apparent and understood from the following detailed description of the invention, the attached claims, and the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
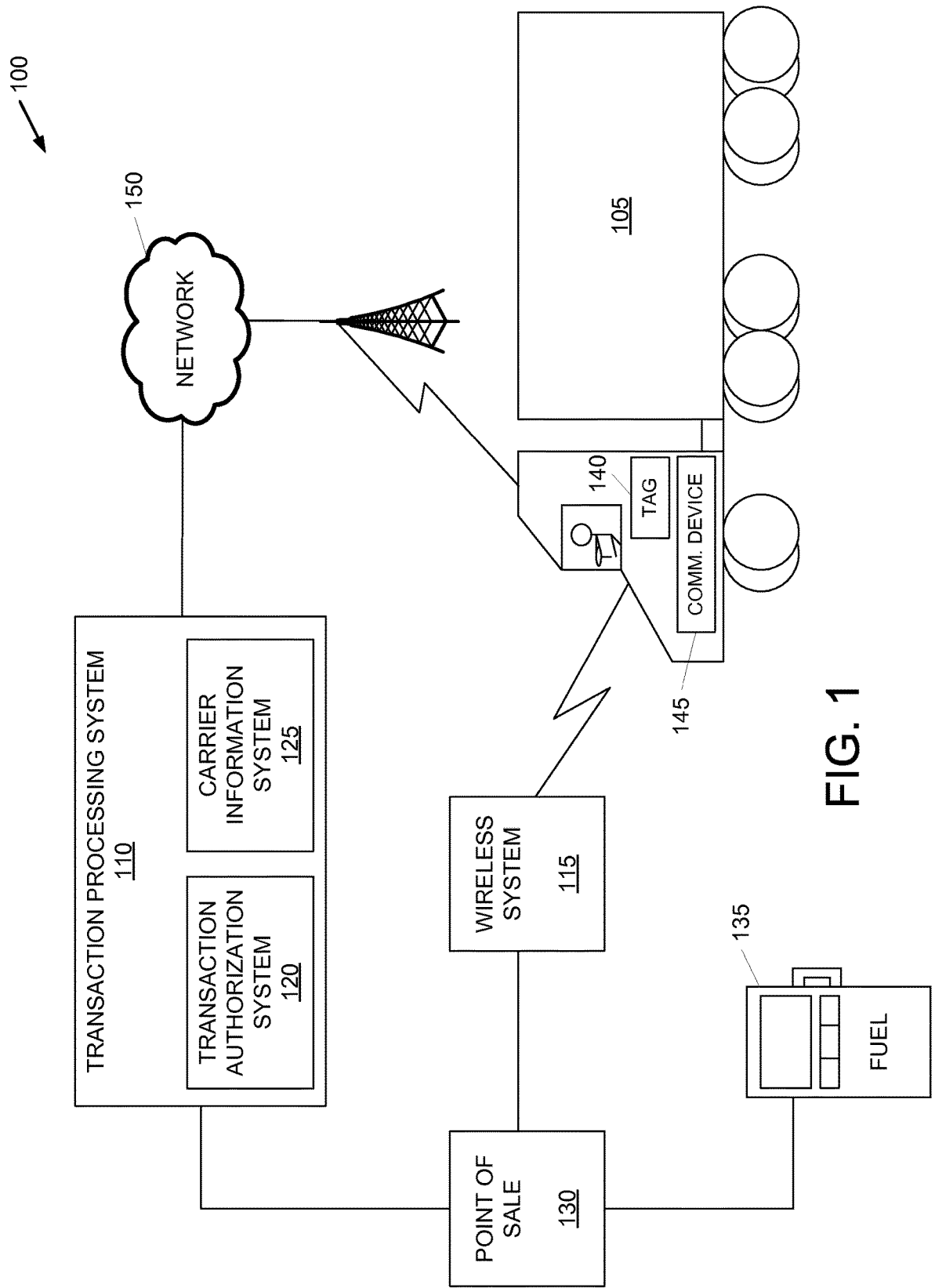
FIG. 1 illustrates a transaction authorization and processing system according to one or more aspects described herein.

FIG. 1 illustrates an example of a transaction processing and authorization system 100 configured to function with transportation vehicles such as a truck 105. While a truck 105 is described as the transportation vehicle in this example, the aspects described herein may be applied to a variety of different vehicles including passenger cars. Generally, the transaction for a transportation vehicle may be between a service station, such as a fuel service station, and the carrier or owner of the vehicle since the driver is typically an agent of the carrier or owner. The driver may initiate a transaction and provide transaction information through a transaction request. In some examples, sales and service transaction processing and authorization systems may require a driver to exit the cab of the vehicle to enter information for transaction authorization at the point of sale (e.g., a fuel station). For example, transaction information may be entered using the keypad at the point of sale system or entered by a cashier at a fuel counter. This transaction information may include driver identification information, trip identification information, trailer identification information, truck identification information, license number, load identification information (e.g., dispatch number, load number, order number), loyalty card information, and payment information. Accordingly, entry of the transaction information may be time consuming and difficult depending on the interface provided at the point of sale or the location of the point of sale.

To streamline and facilitate the process, the system 100 may provide the driver with the convenience of entering transaction information or identification information from within the vehicle, and the ease of using a device which is more suited to entry of information. In some examples, the entry of transaction and/or identification information may be provided using a combination of infrastructure at a service station, communication devices of the vehicle, and communication networks. The system 100 may include various facilities including a transaction processing system 110 comprising a transaction authorization system 120 and a carrier information system 125, wireless system 115 (e.g., radio frequency identification (RFID) system), point of sale 130, and fuel dispenser 135. The system 100 may further include a wireless tag 140 such as a RFID tag or transponder 140 and a communication device 145 on the vehicle or in the cab of the vehicle. The communication device 145 may also be within the general vicinity of the vehicle or within communication range with the RFID tag 140. In some arrangements, the communication device 145 may be physically distinct from the tag 140. In other examples, the tag 140 may be configured to be inserted into or otherwise mounted in communication device 145.

A transaction processing and authorization system 100 may include, in some examples, a system or infrastructure that supports communication with devices on a vehicle to facilitate the process of authorizing and processing transactions.

A point of sale 130 may include, in some examples, a system for processing transactions (e.g., authorizing and completing fuel sale transactions) on behalf of the provider of the services or goods. Point of sale systems may process different types of transactions using different types of authorization and payment methods.

The transaction processing system 110 may establish a wireless network connection with truck 105 and/or a driver thereof to send and receive transaction related information such as driver identification information, trip identification information, trailer identification information, truck identification information, license number, load identification information (e.g., dispatch number, load number, order number), loyalty card information, and payment information. For example, the transaction processing system 110 may establish a wireless network connection through network 150 with the communication device 145. The wireless network connection may include a wireless wide area network (WAN), satellite communication network, cellular network and/or wireless Local Area Network (LAN) such as Wi-Fi.

The transaction processing system 110 may include a transaction or fuel authorization system 120 and a carrier information system 125. The transaction processing system 110 may manage connections between the transaction authorization system 120 and the carrier information system 125 associated with truck 105. In particular, in one example, the transaction authorization system 120 may communicate with carrier information system 125 to access data stored therein and verify and authorize transaction requests. Additionally, in some arrangements, the transaction processing system 110 may be different from and/or located separately from carrier information system 125. For example, the transaction authorization system 120 may be located at or otherwise associated with the fueling station and in communication with the carrier information system through a wireless or wired communication connection over a network. The carrier information system 125, on the other hand, may be situated at a carrier location. The transaction authorization system 120 may also be located at the site of a third-party or under the same operator as the carrier information system 125.

Communications between the transaction processing system 110, carrier information system 125 and fuel station 135 may be conducted using a variety of communication methods including wired and wireless communication solutions. Wired connections, for example, may include local area networks (LANs), Internet Protocol (IP) networks, satellite communication networks, cable networks and/or fiber optic communication links. Wireless connections, for example, may include a wireless wide area network (WAN), satellite communication network, cellular network and/or wireless Local Area Network (LAN) such as Wi-Fi.

Carrier information system 125 may include a system, database and/or device corresponding to an organization or a company associated with truck 105 and/or the driver of truck 105. For example, carrier information system 125 may be operated by a carrier organization or company to which the truck 105 belongs and/or with which the driver is employed or otherwise engaged. In one or more instances, the organization or company may be a carrier or shipping company. The carrier information system 125 may include a database storing operations information. For example, a carrier information system 125 may store and maintain data relating to shipping routes, delivery times, truck and/or driver assignments, costs, driver information, budgets and the like. Additionally, the carrier information system 125 may provide this information to the transaction authorization system (e.g., of a fueling station or service provider) to be used by the transaction authorization system to determine whether a particular transaction request should be authorized. The carrier information system may also accept and process transaction authorization requests and determine whether these requests should be authorized based on information stored in the carrier information system 125. In another aspect, the carrier information system 125 may be used to authenticate the requestor or driver based on information stored in the carrier information system 125. Carrier information system 125 may further receive data and/or input from various sources including truck 105, a driver, and/or a third party system such as a third-party transaction authorization system.

The wireless system 115 may be a RFID system including RFID readers and RFID tags. The RFID reader may be located at a service station or at a fuel station, and the RFID tag may be RFID tag 140 associated with or located on the truck 105 or other vehicle. The cab of truck 105 may include a communication device 145 which is capable of communicating with the RFID tag 140. The communication device 145 may communicate with the RFID tag 140 over a wired or wireless connection. For example, the communication device 145 may use a Bluetooth connection, near field communication (NFC) connection, infrared (IR), or Wi-Fi connection to communicate with the RFID tag 140. The RFID tag 140 and the communication device 145 may also communicate through wired interfaces. The communication device 145 may further be configured to communicate with other devices or systems such as the transaction processing system 110 and carrier information system 125 over a communication network such as a wireless wide area network (WAN), satellite communication network, cellular network and/or wireless Local Area Network (LAN) such as Wi-Fi. For a wired or physical connection, the communication device 145 may communicate with the RFID tag through a wired connection such as a cable having a physical communication interface compatible with the communication device 145. For example, the physical communication interface of the cable may be a serial type communication interface.

While the transaction processing system 110 and the point of sale 130 have been described and illustrated as two systems, these systems may also be implemented as a single system including the functionality of both systems. Similarly, the wireless system 115 may also be integrated with the point of sale 130.

Figure 2:
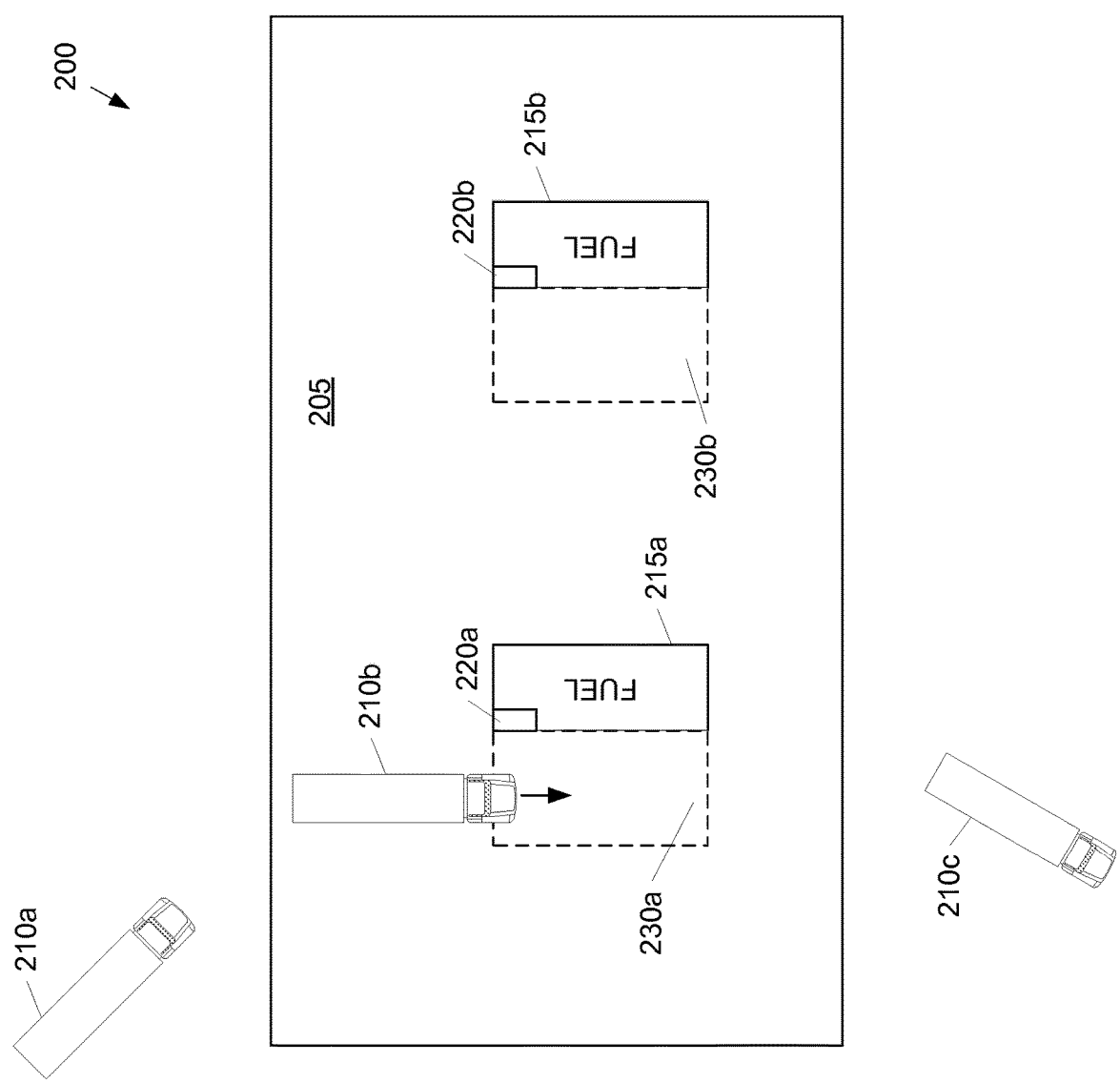
FIG. 2 illustrates a service station environment according to one or more aspects described herein.

FIG. 2 illustrates a service station environment 200 in which the entry and exit of vehicles from the station and predefined service areas thereof may be detected. Service station 205 may provide fueling services in addition to other driver and vehicle services. Service station 205 may comprise a plurality of fuel stations 215 which include short-range sensors 220. The sensors 220 may be configured to detect the entry of a vehicle such as truck 210*b* into a sensor area 230 of fuel station 215 using sensor 220. If a vehicle exits the predefined service detection area, e.g., area 230*a*, fuel station 215*a* may automatically shut off. Data regarding the times of vehicle entry and exit and other transaction related information may be sent to a carrier information system 125 of a carrier organization to which the vehicle belongs or is otherwise associated.

A vehicle's arrival and presence within a predefined service area may be detected using various sensors and short-range sensors and communication devices such as RFID readers and RFID tags, BLUETOOTH, short-range WiFi devices and the like. For example, a driver or a vehicle may include one or more RFID tags storing identification information. The RFID tags may be read by a reader once the tags are within a specified proximity such as within communication range of a reader. Accordingly, a service station may control transactions and the activation/deactivation of service systems based on whether the vehicle or driver is within the predefined service area. With respect to the system of FIG. 1, the short-range sensors 220 may be a RFID reader of the RFID system 115 capable of detecting the presence of a RFID tag within a predefined service area, such as the RFID tag 140, and reading and writing data to and from the RFID tag 140.

The point of sale 130 may be a fuel station 215 of the service station 205 or a cashier work station (not shown) of the service station 205. For example, the fuel station 215 may include a keypad and a display which the driver can use to enter transaction information and request authorization of a transaction.

Figure 3:
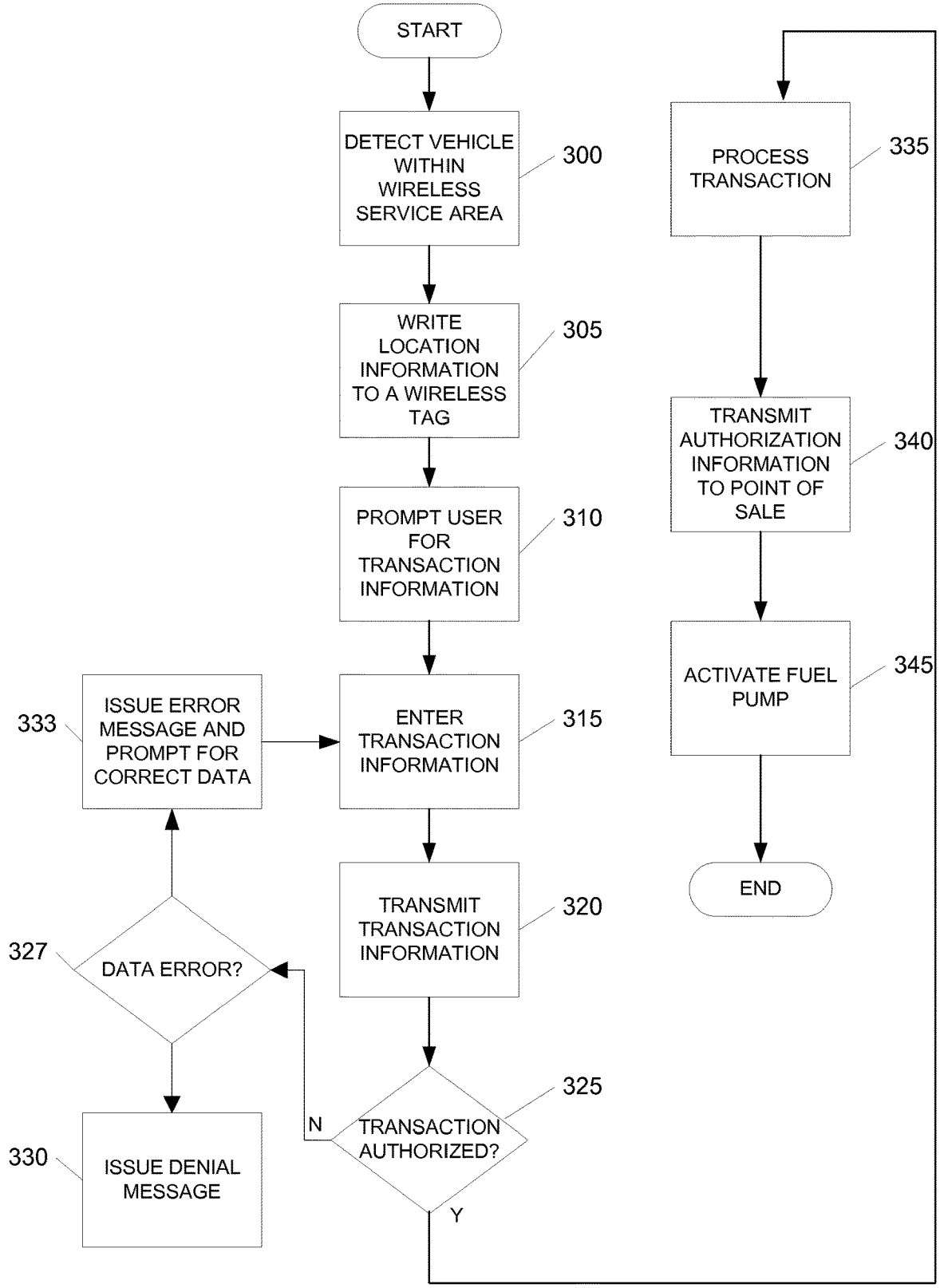
FIG. 3 is a flowchart illustrating a method for authorization and processing vehicle transaction requests according to one or more aspects described herein.

FIG. 3 is a flowchart illustrating an example of a method for processing a vehicle transaction request such as a fueling request.

In step 300, a vehicle's entry into a predefined wireless service area associated with a particular fuel and/or service station, such as a fuel zone, may be detected. For example, a RFID reader of a RFID system 115 or sensor 220*a* may detect the entry of truck 210*b* into sensor area 230*a* of fuel station 215*a*. The truck 210*b* may include a RFID tag 140 and a communication device 145. In step 305, in response to detecting the entry of the truck 210*b* and/or a wireless communication device 145 associated therewith into the wireless service area such as RFID tag 140, the RFID reader 220*a* may write or otherwise transmit location information (e.g., fuel station, fuel lane, service station) for storage in a memory of the RFID tag 140 based on the location of the RFID tag 140 detected by the RFID reader 220*a*. The RFID system 115 may also alert the point of sale 130 of the arrival of a vehicle with a RFID tag and provide the point of sale 130 with information associated with the vehicle or the RFID tag such as an identification number or serial number. The location information may be written or stored on the RFID tag 140 after and/or in response to determining that the RFID tag supports communication with a communication device or will be requesting transaction authorization through the point of sale 130. For example, the RFID tag 140 may be configured to indicate that transaction authorization is to be requested through the point of sale 130, or the RFID tag 140 may be configured to indicate that communication with the communication device is supported and provide this information in response to a query about communication device support. The RFID tag 140 may have established a communication link with the communication device prior to the vehicle's arrival in the predefined wireless service area or may begin the process of establishing a communication link with the wireless device in response to the writing of location information in the RFID tag 140.

In step 310, in response to the detection of the arrival of the truck 210*b* in sensor area 230*a*, the system 100 may prompt the driver to enter initial transaction information and any additional transaction information. Requests to the driver for additional transaction information may subsequently follow in prompt(s). For example, the RFID tag 140, upon and/or in response to communications from the fuel station (e.g., RFID reader 220*a* of wireless system 115), may trigger the communication device 145 to prompt the driver to enter initial transaction information by displaying the prompt or a transaction information request on a display screen of the communication device 145. The initial transaction information requested may be information used in authenticating the driver and/or confirming that the driver is an authorized user or driver. The initial transaction information may include driver identification information such as driver's license information, biometric data (e.g., fingerprint, retina scan, etc.), vehicle identification information, load information, and route information. Additional transaction information may be general transaction related information such as the transaction amount requested, payment method, and the type of items to be purchased. Alternatively, the communication device 145 may continuously, periodically or aperiodically monitor the RFID tag and determine that location information has been written to the RFID tag in response to an arrival at a service station and/or fuel station. In response, the communication device 145 may initiate a program to assist the driver or prompt the driver to enter or provide transaction information.

Alternatively, a driver and/or truck 105 may initiate a transaction with a fuel station 215 either manually or automatically. For example, truck 215 and/or a communication device 145 may automatically generate and issue a transaction request to the transaction processing system 110 with the transaction request including transaction data which may be pre-stored upon entering a wireless communication area serviced by service station 205 or fuel station 215. Station 205 may employ a wireless communication network having a limited range to allow trucks such as truck 210*a* and/or drivers initiate various transactions once they are within the predefined range or proximity.

In step 315, the driver may enter initial transaction information and any additional information. This information may be entered by the driver at a point of sale 130 or via a vehicle based communication system. The vehicle based communication system may be an in-cab communication system and may include the communication device 145 which may be located in the cab of the truck 210*b* or within proximity of the RFID tag 140 (e.g., within communication range with the RFID tag), the service station 205, a fuel station 220*a*, or the truck 210*b*. By enabling the user to enter transaction information using the communication device 145, the system 100 provides the driver with the convenience and flexibility of entering transaction information from within the vehicle such as a cab of a truck or within a certain proximity, and potentially using a user interface (e.g. alphanumeric keyboard, large touch screen, etc.) more conducive to such data entry. In general, transaction information can include driver identification information, trip identification information, trailer identification information, truck identification information, license number, load identification information (e.g., dispatch number, load number, order number), loyalty card information, and payment information.

For example, the driver may use communication device 145 to receive and communicate the information to the transaction processing system 110 and the point of sale system 130. In some examples, the communication from the communication device 145 to one or more other devices may be performed through RFID tag 140. The communication device may be any communication device capable of supporting wired or wireless communication with other devices or systems. The communication device may be a mobile device. Examples of communication devices include personal digital assistants (PDAs), mobile telephones, portable computers, tablets, and the like.

Because the communication device 145 may be used to provide initial transaction information and any additional transaction information, the driver may be able to provide this information without being required to exit the cab of the truck and by not being required to be at a specific location such as a point of sale 130. In some examples, the truck and/or driver might not need to be at the fueling station. Furthermore, the communication device 145 may store the transaction information (e.g., prior to arriving at the fueling station) and automatically provide at least some of the requested transaction information. For example, the transaction information may also be pre-stored or previously entered into and stored in the communication device 145 for later use. In response to the prompt, the communication device 145 may automatically provide the transaction information from memory and/or based on location information. The driver may be able to confirm the pre-stored or previously entered transaction information and/or authorize the transmission thereof before the transaction information is transmitted. For example, different locations, routes, service stations, and/or fuel stations may result in different transaction information. Based on the location information provided by the RFID system 115, the communication device 145 may determine which transaction data stored on the communication device 145 is relevant for the transaction authorization request at service station 205 or fuel stations 215*a*, 215*b*. The location information may be location information provided by the RFID system 115 such as fuel station, fuel lane, and/or service station information or may be determined based on a GPS location or network connection of the communication device 145 such as base stations in the vicinity of the communication device and the signal strength of a communication link between the communication device and the base stations.

In step 320, the communication device 145 may transmit the entered or provided initial transaction information and any additional transaction information to the transaction processing system 110. The transaction information may be transmitted in a transaction authorization request. The communication device may transmit the information over a network such as a wireless network to the transaction processing system 110. The wireless network may be a wireless wide area network (WAN), satellite communication network, cellular network and/or wireless Local Area Network (LAN) such as Wi-Fi.

The user may provide all or part of the transaction information using the communication device 145, or the user may provide information which the carrier information system 125 of the transaction processing system 110 can use to provide all or part of the transaction information or supplement the transaction information. In some aspects, the user may provide transaction information such as initial transaction information using the communication device 145, and the communication device can transmit the entered information to the transaction processing system 110. The carrier information system 125 of the transaction processing system 110 may be able to determine from the received information the corresponding transaction information stored in the carrier information system 125. Additionally, the carrier information system 125 may be able to supplement the received transaction information. In some aspects, the carrier information system 125 can communicate the information stored in the carrier information system 125 to the transaction authorization system 120 or to the point of sale 130 (with or without use of the communication device 145).

In step 325, the transaction processing system 110 determines whether to authorize the requested transaction. The process of authorization may include a variety of steps including authenticating the requestor as an authorized user, verifying the identification information of the driver requesting transaction authorization, and determining whether an identified carrier associated with the requestor has sufficient funds to pay for the transaction. Authorization may also relate to determining whether the requestor is authorized by his or her carrier to make purchases or receive cash advances of above a certain amount of money and/or at a particular service station or location which may be determined based on the location information. For example, a carrier may restrict its drivers to purchases at a single station of $40 or less (not including fuel) and/or at a service station in a certain geographic area. Accordingly, a transaction request for purchasing $50 worth of specified products would be determined to be unauthorized by the carrier, and a transaction request for a service station outside of a certain geographic location would be denied. Additionally, a carrier may restrict transactions to a predetermined list of service stations, and the transaction request for a particular service station may be determined by the location information included in the transaction request. For example, the location information such as a fuel station, fuel lane, service station identifier, or geographic location (e.g., GPS-determined location) can be used to determine whether the transaction request is originating from an approved service station and for an approved service station.

The identification information of a requestor (e.g., a requesting truck and/or driver) transmitted via the transaction request(s) may be verified. One method of validating the identification information provided in the transmission request(s) is by confirming the information with a transaction processing system 110 or with a carrier information system 125 in FIG. 1. Identification information may include a smart card driver's license information, biometric data (fingerprints, retina scan, etc.), and vehicle information (truck serial number, truck identification number, load information, etc.). Identification information may be stored at the fuel authorization system, within the vehicle based communication system, or in other devices capable of communicating with devices of the vehicle based communication system such as other RFID tags, NFC cards, or smart cards.

A carrier or information system associated with the requestor may be determined from the information included in the transmission request(s). For example, the requestor may explicitly identify a carrier or carrier information system for validating the request information. Alternatively or additionally, a transaction processing system or fuel station may have an internal database associating a truck, driver and/or truck-mounted device ID with a carrier. The internal database may further identify the address and/or contact information corresponding to the carrier based on a priori knowledge, e.g., provided during an initial registration process or sign-up procedure. In one or more arrangements, the internal database may further be used to verify that carrier information received from a requestor does indeed correspond to the requestor's ID prior to validation with the carrier information system.

If, in step 325, a determination is made that the transaction is unauthorized, the transaction processing system 110 may determine whether the denial of the transaction was a result of a data error at step 327. For example, the transaction processing system 110 may determine that the entered transaction information does not match a known format for the information (e.g., alphanumeric format) or that a typographical error is present in the transaction information. If in step 327, the system 110 determines that the denial was a result of a data error, the system 110 may issue an error message and provide a prompt or request for correct data at step 333. The process may return to step 315 in which the user provides transaction information as discussed herein.

If in step 327, the system 110 determines that the denial was not a result of a data error, a denial indication or message may be transmitted to the requestor in step 330. In one or more instances, a denial message may include an opportunity for the requestor to revise his transaction request and/or related information. The denial message may be presented on the screen of the communication device 145 and provide the driver with the opportunity to re-enter, revise, and/or re-submit transaction information for transaction authorization. Alternatively or additionally, a message confirming the information transmitted may be sent to the requestor to provide another validation opportunity, for example, using the communication device 145 or another device such as the point of sale 130. An option of canceling the transaction authorization request may also be presented on the screen of the communication device 145. The denial message may be transmitted to the communication device 145 from the transaction processing system 110 through a wireless network or through another communication interface of the communication device 145.

If the transaction is authorized in step 325, the transaction processing system 110 may process the transaction by processing payment authorization for the transaction in step 335 and transmitting a transaction authorization indication to the point of sale 130 in step 340. Alternatively, the transaction processing system 110 may transmit an indication that the transaction is authorized to the point of sale 130, and the point of sale 130 may process the payment authorization for the transaction.

In step 345, the point of sale 130 may activate the fuel station or pump indicated in the location information determined by the RFID system 115 to enable dispensing of fuel for the truck 210b in response to receiving authorization or approval of the transaction. The point of sale 130 may activate the fuel pump to dispense an authorized amount of fuel. The point of sale 130 may also communicate a confirmation of the transaction authorization to the communication device 145 through the RFID system 115. Once the transaction is completed, the completed transaction information may be transmitted to the vehicle based system through the RFID tag or through a wireless network from the point of sale 130.

Figure 4:
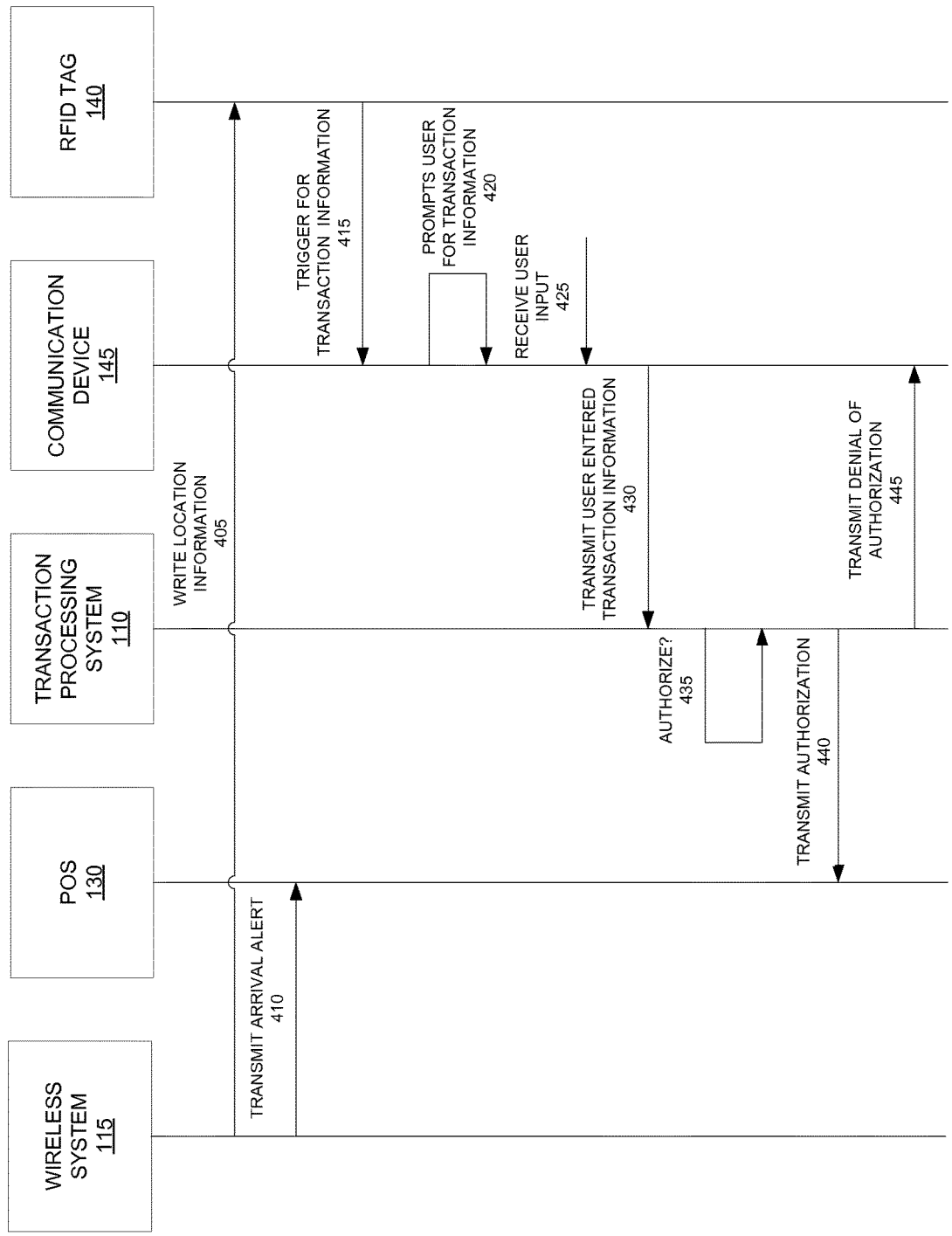
FIG. 4 is a process flow diagram of the method illustrated in FIG. 3.

FIG. 4 is a process flow diagram showing communications between components of the system 100 with respect to the method illustrated in FIG. 3.

At 405, the wireless system 115 may detect a vehicle's entry into a predefined wireless service area associated with a particular fuel and/or service station, such as a fuel zone. In response to detecting the presence of the vehicle in the predefined wireless service area, the wireless system 115 may transmit location information to a RFID tag 140. A RFID reader of the wireless system 115 may also write the location information in a memory of the RFID tag 140. The wireless system 115 may also transmit an arrival alert to the point of sale 130 at 410.

At 415, the RFID tag 140 may transmit the received location information to the communication device which may cause the communication device 145 to prompt the user for transaction information at 420. At 425, the communication device 145 can receive user input of the transaction information or user confirmation of pre-stored transaction information. The communication device 145 may transmit the inputted transaction information in a transaction authorization request to the transaction processing system 110 at 430. Based on the received transaction information, the transaction processing system 110 may determine whether to authorize the transaction at 435. If the transaction is authorized, the transaction processing system 110 may transmit an authorization to the point of sale 130 at 440. If the transaction is denied, the transaction processing system 110 may determine whether the cause of the denial is a data error. If a data error is not present in the transaction information, the transaction processing system 110 may transmit a denial message indicating denial of authorization at step 445. Alternatively, if the transaction processing system 110 determines that a data error is present, the transaction processing system 110 may transmit an error message at 445 which causes the communication device to prompt the user to re-enter the transaction information. For example, the transaction processing system 110 may determine that the entered transaction information does not match a known format for the information (e.g., alphanumeric format) or that a typographical error is present in the transaction information.

Figure 5:
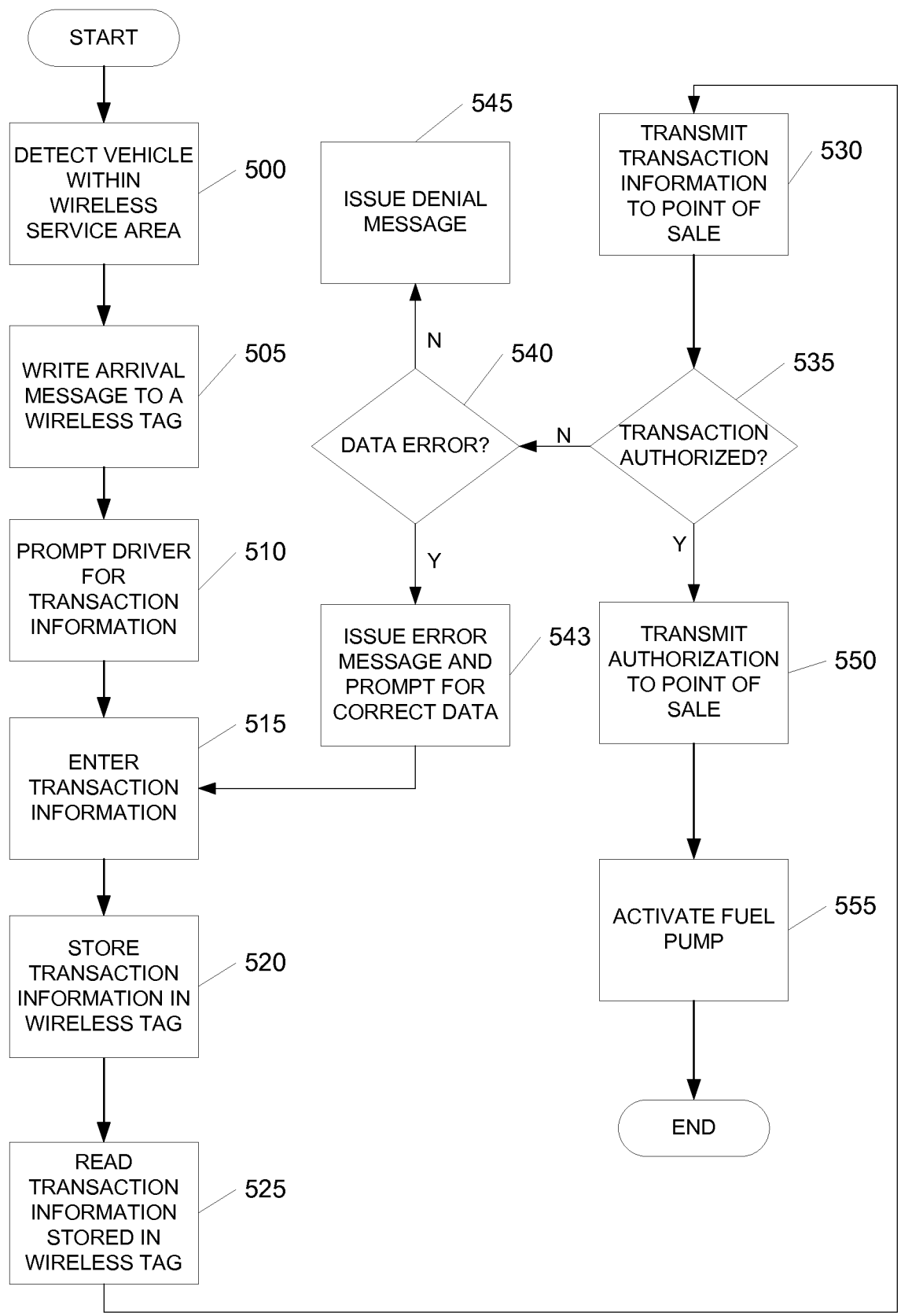
FIG. 5 is a flowchart illustrating another method for authorization and processing vehicle transaction requests according to one or more aspects described herein.

FIG. 5 illustrates a flow chart of another example of a method for processing a vehicle transaction request.

In step 500, a vehicle's entry into a predefined wireless service area associated with a particular fuel and/or service station may be detected such as a fuel zone. For example, a RFID reader of a RFID system 115 or sensor 220a may detect the entry of truck 210b into sensor area 230a of fuel station 215a. The RFID tag 140 and a communication device 145 may be associated with a particular truck and/or driver.

In step 505, the RFID reader may determine whether the RFID tag 140 supports or is configured to request authorization through a point of sale 130. In response to a determination that the RFID tag 140 supports or is configured to request authorization through a point of sale 130, the RFID reader may write an arrival message on the RFID tag 140. The arrival message may include location information of the RFID tag based on the location detected by the RFID reader. In step 510, the vehicle based communication system may detect the arrival message on the RFID tag, and in response, the vehicle based communication system may prompt the driver for initial transaction information and any additional transaction information. For example, the communication device 145 may receive an arrival message from the RFID tag 140 including location information provided by the RFID reader or system or may detect the presence of an arrival message stored on the RFID tag 140. The RFID system 115 may also transmit an arrival alert to the point of sale 130 with the arrival alert including identification information of the truck, driver, and/or RFID tag 140 of the truck. Request(s) for additional transaction information may follow in a subsequent prompt(s) to the driver via the communication device 145.

In step 515, the driver may conveniently enter the transaction information and any additional transaction information using the vehicle based communication system such as communication device 145. For example, the driver may use a communication device 145 having a communication link with the RFID tag to enter the transaction information and any additionally requested information. The communication device 145 may be located in the cab of the truck 210b or within proximity of the RFID tag 140, the service station 205, a fuel station 220a, or the truck 210b. By enabling the user to enter transaction information using the communication device 145, the system 100 provides the driver with the convenience and flexibility of entering transaction information from within the vehicle such as a cab of a truck or within a certain proximity of the RFID tag 140, the service station 205, a fuel station 220a, or the truck 210b. In other words, the driver may be able to provide transaction information without being required to exit the cab of the truck and by not being required to be at a specific location such as a point of sale 130 by using the communication device 145 to provide initial transaction information and any additional transaction information.

Furthermore, the communication device 145 may store the transaction information and automatically provide at least some of the requested transaction information. For example, the transaction information may also be pre-stored or previously entered into and stored in the communication device 145 for later use. In response to the prompt, the communication device 145 may automatically provide the transaction information from memory and/or based on location information. The driver may be able to confirm the pre-stored or previously entered transaction information before the transaction information is transmitted. For example, different locations, routes, service stations, and/or fuel stations may result in different transaction information. Based on the location information provided by the RFID system 115, the communication device 145 may determine which transaction data stored on the communication device 145 is relevant for the transaction authorization request at service station 205 or fuel stations 215a, 215b. The location information may be location information provided by the RFID system 115 such as fuel station, fuel lane, and/or service station information or may be determined based on a GPS location or network connection of the communication device 145.

In step 520, the information entered by the driver or otherwise determined by the communication device may be communicated to the RFID tag through a wired or wireless connection and stored in a memory of the RFID tag. In step 525, the RFID reader may read the transaction information stored in the RFID tag through a wireless RFID interface, or the RFID tag may transmit the stored transaction information through a wireless RFID interface to a RFID reader of the RFID system 115. In step 530, the RFID reader of the RFID system 115 may transmit the received transaction information to the point of sale 130.

In step 535, the point of sale 130 may communicate with a transaction processing system 110 to determine whether the transaction is to be authorized. For example, the point of sale 130 may transmit the received transaction information to the transaction processing system 110 through a wired or wireless connection. The transaction processing system 110 may determine whether to authorize the transaction as previously described herein. In some aspects, the point of sale 130 may determine whether to authorize the requested transaction based on stored data at the point of sale 130 or in a remote location such as the transaction authorization system 120 or the carrier information system 125. The data may be communicated to the point of sale 130 using a wired or wireless connection in response to the point of sale receiving a transaction authorization request.

In step 540, if the transaction is not authorized, the transaction processing system 110 may analyze the received transaction data and determine whether the denial was a result of a data error. If the denial was not a result of data error, the transaction processing system 110 may send a denial indication to the point of sale 130 or directly to the communication device 145 in step 545. If the denial indication is transmitted to the point of sale 130, the point of sale may communicate with the RFID system 115 to pass the denial indication to the communication device 145 through RFID tag 140. The denial indication may be in the form of a denial message which may be presented on the screen of the communication device 145.

If the denial of the transaction authorization was a result of a data error, the transaction authorization system 110 may issue an error message and prompt for correct data. For example, the transaction processing system 110 may determine that the entered transaction information does not match a known format for the information (e.g., alphanumeric format) or that a typographical error is present in the transaction information. The error message may provide the driver with the opportunity to re-enter and re-submit transaction information for transaction authorization by returning to step 515. An option of canceling the transaction authorization request may also be presented on the screen of the communication device 145. In response to repeated data errors, the transaction authorization may transmit a denial message.

In step 550, an indication of approval or authorization may be transmitted to the point of sale 130 in an authorization message if the transaction is authorized. In step 555, the point of sale 130 may then activate the fuel pump in response to receiving the authorization. The point of sale 130 may also communicate a confirmation of the transaction authorization to the communication device 145 through the RFID system 115. Once the transaction is completed, the completed transaction information may be transmitted to the vehicle based system through the RFID tag or through a wireless network from the point of sale 130.

Figure 6:
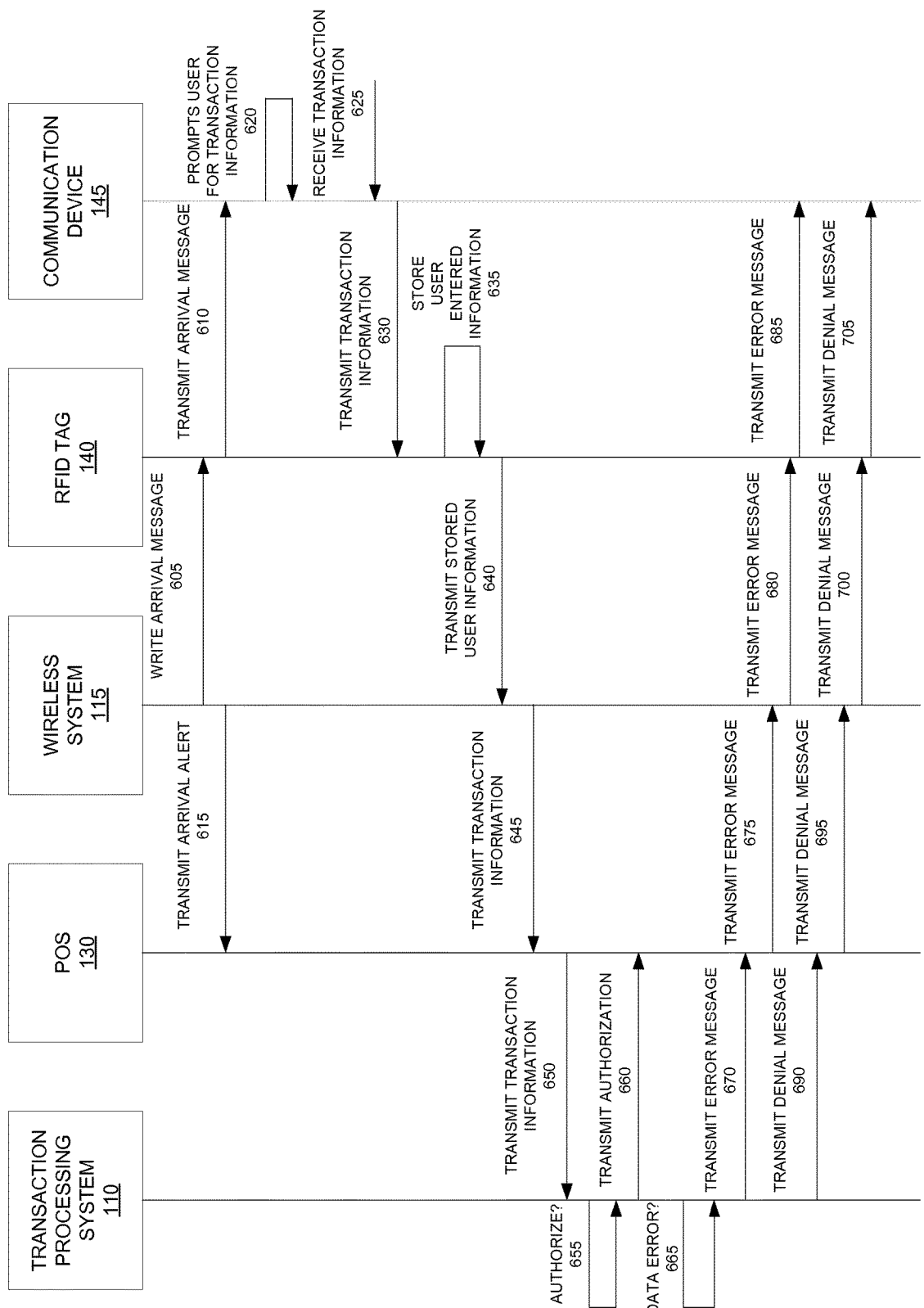
FIG. 6 is a process flow diagram of the method illustrated in FIG. 5.

FIG. 6 is a process flow diagram showing communications between components of the system 100 corresponding to the exemplary method illustrated in FIG. 5. A service station may have a system such as wireless system 115 that can detect the presence of a wireless tag such as wireless tag 140. When the wireless tag 140 which may be located on a vehicle enters a predetermined fuel zone, the wireless system 115 can detect the presence of the wireless tag 140 and in response to the detection write or send an arrival message on the wireless tag 140 at 605. The wireless system 115 may also transmit an arrival alert 615 to the point of sale 130 in response to detecting the wireless tag 140 in the predetermined zone.

In response to receiving the arrival message, the RFID tag 140 transmits an arrival message at 610 to the communication device 145. At 620, the communication device 145 can prompt the user for transaction information in response to receiving the arrival message from the RFID tag 140. At 625, the communication device 145 receives transaction information from the user which may be in the form of information inputted using keys of the communication device 145. The communication device 145 then passes or transmits the transaction information to the RFID tag 140 at 630. The RFID tag 140 stores the user entered transaction information received from the communication device 145 at 635, and at 640, the RFID tag 140 transmits the stored user information to the wireless system 115. The wireless system 115 transmits the transaction information to the point of sale 130 at 645. The point of sale 130 receives the transaction information from the wireless system 115 and in response transmits the transaction information at 650 to the transaction processing system 110. Based on the received transaction information which originated as user input received at the communication device 145, the transaction system 110 determines whether to authorize the transaction at 655. If the transaction processing system 110 authorizes the transaction, the transaction processing system 110 transmits an indication of the authorization to the points of sale 130 at 660.

If at 655 the transaction processing system 110 does not authorize the transaction, the transaction processing system 110 determines whether a data error is present in the transaction information at 665. If a data error is present, the transaction processing system 110 may transmit an error message at 670 to the point of sale 130. The point of sale may transmit or forward the error message to the wireless system 115 at 675. The wireless system may pass the error message to the RFID tag 140 at 680. The RFID tag 140 may transmit or forward the error message to the communication device 145 at 685. The error message may cause the communication device 145 to prompt the user to re-enter transaction information at 620. If a data error is not present, the transaction processing system 110 may transmit a denial message 690 to the point of sale 130. The denial message may be transmitted to the communication device 145 in a manner similar to the error message in 695-705.

While the methods and systems described herein have related, in greater part, to fueling transactions and fuel dispensation systems, one of skill in the art will appreciate that the methods and system may be applied to any of a number of transaction types and service systems where the user is required to provide or enter data at a specific location. For example, a transaction request for tire air may be processed and authorized in much the same way as fuel. Specifically, transaction information may be provided using a communication device which may be located within the vehicle and the transaction request may be authorized and activated without requiring the driver to exit the vehicle or approach a point of sale. Other transaction types that may similarly implement the aforementioned methods and systems include maintenance service requests (e.g., oil change, changing tires, vehicle washing, etc.), parking reservation requests and/or cargo pick-up/drop-off requests. Further, other shipping and transportation industries may also implement the systems and methods described herein. For example, mail and other cargo are commonly transported by airplane and/or boat. As such, the flexibility and convenience provided by the system described herein may also be used to streamline airplane and boat operations such as refueling and maintenance services.

The methods and features recited herein may further be implemented through any number of computer readable media that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of IC. Further, the IC may output image data to a display buffer.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A method, comprising:
   monitoring, by a tag reader of a wireless system, for detection of a wireless tag of a vehicle within a predefined wireless service area of a service station associated with the wireless system;
   in response to detecting the wireless tag in the predefined wireless service area of the service station, determining, by the tag reader of the wireless system, whether the wireless tag of the vehicle is configured to request authorization through a point of sale of the service station;
   in response to determining that the wireless tag is configured to request authorization through the point of sale, triggering, by the tag reader of the wireless system, a communication device within proximity of the vehicle to display a user information request on a display of the communication device, wherein the triggering comprises transmitting location information;

receiving, by the tag reader of the wireless system via the wireless tag of the vehicle, user-provided user information originating from the triggered communication device responsive to receiving the location information;

transmitting, by the tag reader of the wireless system to the point of sale, an authorization request comprising the user-provided user information;

receiving, by the tag reader of the wireless system from the point of sale, an authorization indication responsive to the authorization request, wherein the authorization indication includes an authorized amount of fuel to be dispensed at a fuel pump;

activating the fuel pump to dispense the authorized amount of fuel in response to receiving authorization of user information of a user associated with the vehicle; and transmitting, by the tag reader of the wireless system to the wireless tag of the vehicle, the authorization indication.

2. The method of claim 1, wherein the wireless tag comprises a radio frequency identification (RFID) tag and the tag reader comprises an RFID tag reader, and
wherein the user information includes at least one of: driver identification information, trip identification information, trailer identification information, truck identification information, license number, and load identification information.

3. The method of claim 1, wherein the authorization indication further includes a denial message or an error message, and
wherein transmitting the authorization indication comprises: transmitting, by the tag reader to the wireless tag of the vehicle, the denial message or the error message responsive to receiving the authorization indication.

4. The method of claim 3, wherein the error message is configured to cause the triggered communication device to re-display the user information request.

5. The method of claim 1, wherein triggering, by the tag reader of the wireless system, the communication device within proximity of the vehicle to display the user information request on the display of the communication device comprises:
transmitting, by the tag reader of the wireless system to the wireless tag of the vehicle, a lane location of the vehicle at a service station.

6. The method of claim 1, wherein within proximity of the vehicle comprises within communication range of the wireless tag of the vehicle.

7. A system, comprising:
one or more tag readers;
one or more processors; and
one or more memories storing instructions, that when executed by the one or more processors, cause the system to:
monitor, by the one or more tag readers, for detection of a wireless tag of a vehicle within a predefined wireless service area of a service station associated with the system;
in response to detecting the wireless tag in the predefined wireless service area of the service station, determine, by the one or more tag readers, whether the wireless tag of the vehicle is configured to request authorization through a point of sale of the service station;
in response to determining that the wireless tag is configured to request authorization through the point of sale, trigger, by the one or more tag readers, a communication device within proximity of the vehicle to display a user information request on a display of the communication device, wherein the triggering comprises transmitting location information;

receive, by the one or more tag readers via the wireless tag of the vehicle, user-provided user information originating from the triggered communication device responsive to receiving the location information;

transmit, by the one or more tag readers to the point of sale, an authorization request comprising the user-provided user information;

receive, by the one or more tag readers from the point of sale, an authorization indication responsive to the authorization request, wherein the authorization indication includes an authorized amount of fuel to be dispensed at a fuel pump;

activate the fuel pump to dispense the authorized amount of fuel in response to receiving authorization of user information of a user associated with the vehicle; and transmit, by the one or more tag readers to the wireless tag of the vehicle, the authorization indication.

8. The system of claim 7, wherein the wireless tag comprises a radio frequency identification (RFID) tag and the one or more tag readers each comprise an RFID tag reader.

9. The system of claim 7, wherein the user information includes at least one of: driver identification information, trip identification information, trailer identification information, truck identification information, license number, and load identification information.

10. The system of claim 7, wherein the authorization indication further includes a denial message or an error message, and
wherein transmitting the authorization indication comprises: transmitting, by the tag reader to the wireless tag of the vehicle, the denial message or the error message responsive to receiving the authorization indication.

11. The system of claim 10, wherein the error message is configured to cause the triggered communication device to re-display the user information request.

12. The system of claim 7, wherein trigger, by the one or more tag readers, the communication device within proximity of the vehicle to display the user information request on the display of the communication device comprises:
transmit, by the one or more tag readers to the wireless tag of the vehicle, a lane location of the vehicle at a service station.

13. The system of claim 7, wherein within proximity of the vehicle comprises within communication range of the wireless tag of the vehicle.

14. One or more non-transitory computer readable media storing computer-readable instructions that, when executed, cause one or more processors of a wireless system to:
monitor, by, a tag reader of the wireless system, for detection of a wireless tag of a vehicle within a predefined wireless service area of a service station associated with the wireless system;
in response to detecting the wireless tag in the predefined wireless service area of the service station, determine, by the tag reader, whether the wireless tag of the vehicle is configured to request authorization through a point of sale of the service station;
in response to determining that the wireless tag is configured to request authorization through the point of sale, trigger, by the tag reader, a communication device within proximity of the vehicle to display a user information request on a display of the communication device, wherein the triggering comprises transmitting location information;

receive, by the tag reader via the wireless tag of the vehicle, user-provided user information originating from the triggered communication device responsive to receiving the location information;

transmit, by the tag reader to the point of sale, an authorization request comprising the user-provided user information;

receive, by the tag reader from the point of sale, an authorization indication responsive to the authorization request, wherein the authorization indication includes an authorized amount of fuel to be dispensed at a fuel pump;

activate the fuel pump to dispense the authorized amount of fuel in response to receiving authorization of user information of a user associated with the vehicle; and transmit, by the tag reader to the wireless tag of the vehicle, the authorization indication.

15. The computer-readable media of claim 14, wherein the wireless tag comprises a radio frequency identification (RFID) tag and the tag reader comprises an RFID tag reader, and wherein the user information includes at least one of: driver identification information, trip identification information, trailer identification information, truck identification information, license number, and load identification information.

16. The computer-readable media of claim 14, wherein the authorization indication further includes a denial message or an error message, and wherein transmitting the authorization indication comprises: transmitting, by the tag reader to the wireless tag of the vehicle, the denial message or the error message responsive to receiving the authorization indication.

17. The computer-readable media of claim 16, wherein the error message is configured to cause the triggered communication device to re-display the user information request.

18. The computer-readable media of claim 14, wherein triggering, by the tag reader of the wireless system, the communication device within proximity of the vehicle to display the user information request on the display of the communication device comprises:

transmitting, by the tag reader of the wireless system to the wireless tag of the vehicle, a lane location of the vehicle at a service station.

19. The computer-readable media of claim 14, wherein within proximity of the vehicle comprises within communication range of the wireless tag of the vehicle.

* * * * *